United States Patent [19]

Bertrand

[11] Patent Number: 4,809,589

[45] Date of Patent: Mar. 7, 1989

[54] CORRUGATED DIAPHRAGM FOR A PRESSURE SENSOR

[75] Inventor: Pierre Bertrand, Igny, France

[73] Assignee: Sereg, Montrouge, France

[21] Appl. No.: 15,536

[22] Filed: Feb. 13, 1987

Related U.S. Application Data

[63] Continuation of Ser. No. 688,223, Jan. 3, 1985, abandoned.

[30] Foreign Application Priority Data

Jan. 6, 1984 [FR] France ................ 84 00166

[51] Int. Cl.⁴ .................... F01B 19/00; F16J 3/00
[52] U.S. Cl. .................... 92/98 R; 92/104; 73/715
[58] Field of Search ............ 92/96, 98 R, 104; 73/715

[56] References Cited

U.S. PATENT DOCUMENTS

| 56,694 | 7/1866 | Blake | 92/104 |
| 2,874,569 | 4/1955 | Gray | 92/104 X |
| 4,375,182 | 3/1983 | Zauoda | 92/104 X |

FOREIGN PATENT DOCUMENTS

2016115  7/1969  France.

Primary Examiner—Robert E. Garrett
Assistant Examiner—Mark A. Williamson
Attorney, Agent, or Firm—Sanford J. Asman

[57] ABSTRACT

The diaphragm comprises a peripheral zone (12) and a central zone (16) in the same plane. Between these zones there is a corrugated zone comprising 2n corrugated portions ($18_1$ to $18_4$) which are separated by connection zones ($20_1$ to $20_4$). Any one corrugated portion may be derived from the adjacent corrugated portion by a rotation through 180° about the connection zone, or else by a rotation of $2\pi/2n$ about the diaphragm axis followed by a symmetry about the housing plane.

8 Claims, 5 Drawing Sheets

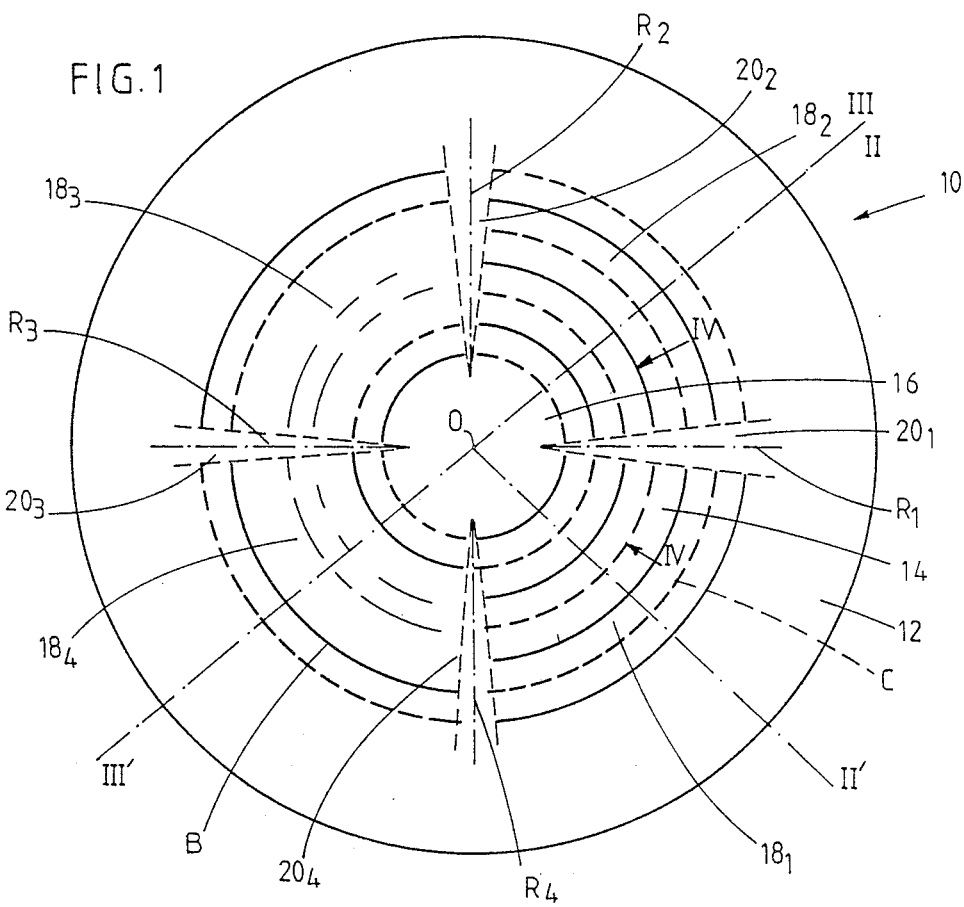
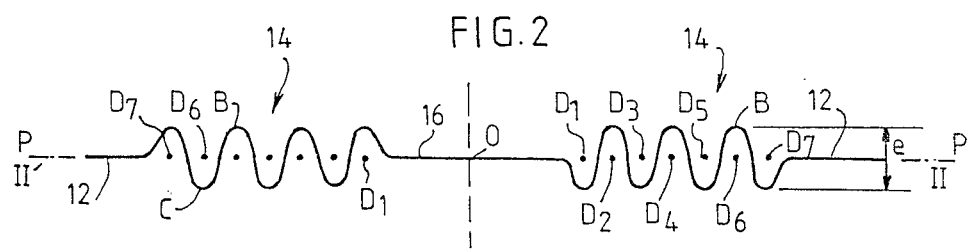
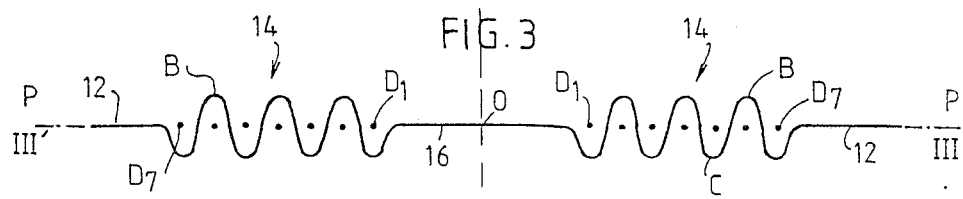

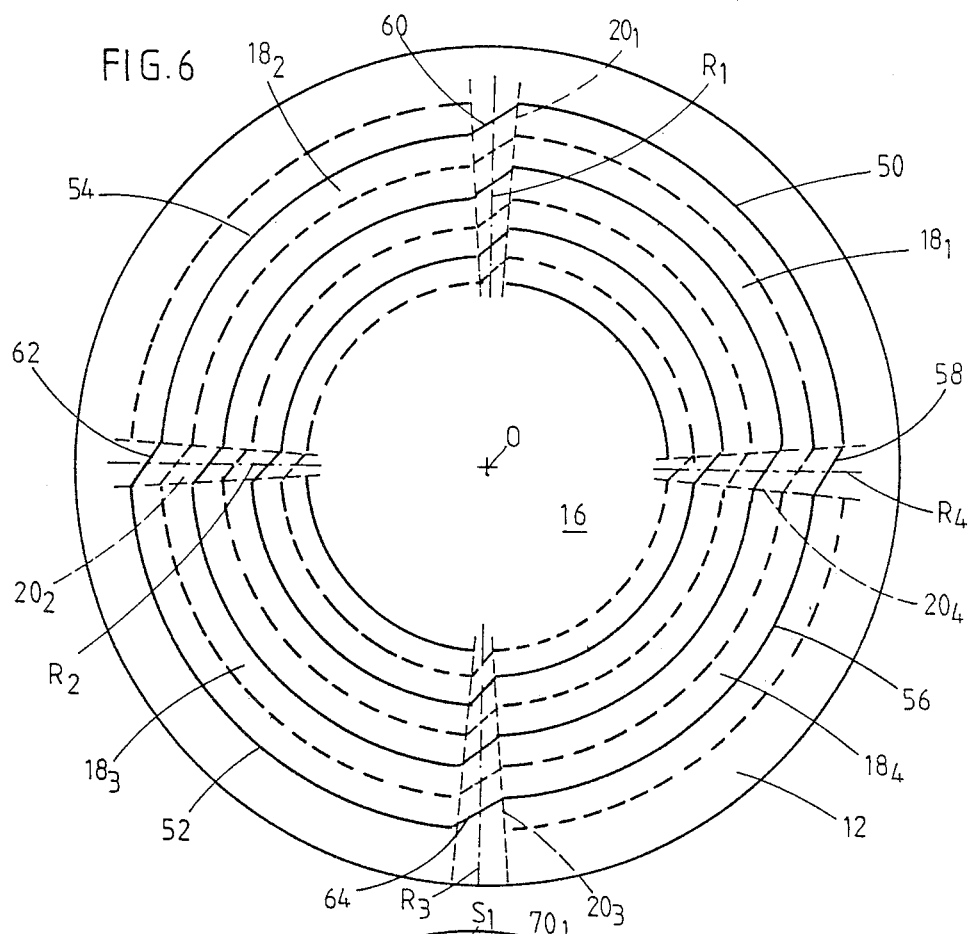
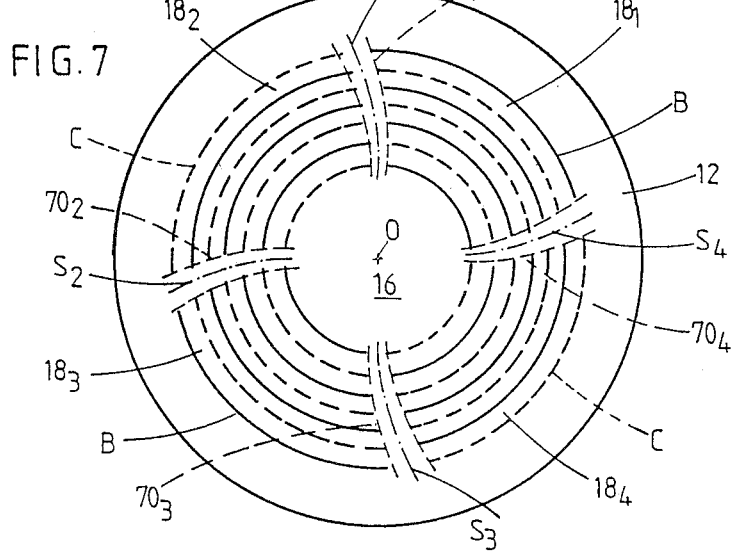

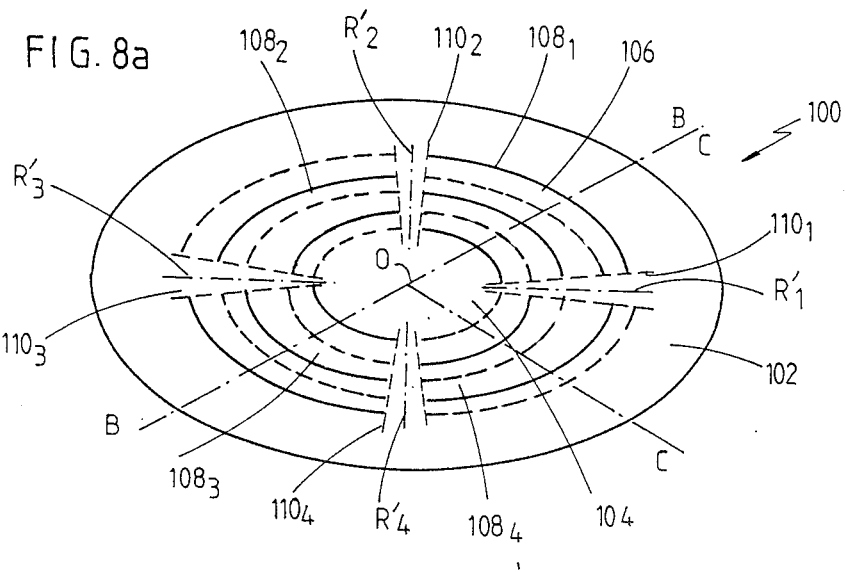
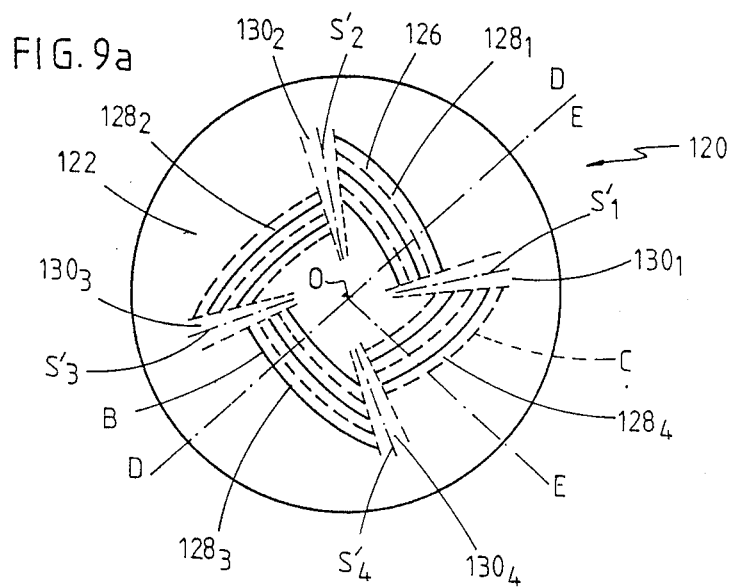

CORRUGATED DIAPHRAGM FOR A PRESSURE SENSOR

This application is a continuation of application Ser. No. 688,223 filed 1-3-85, now abandoned.

The present invention relates to a corrugated diaphragm for a pressure sensor.

More precisely, the present invention relates to a diaphragm serving as the sensitive member of a pressure sensor and in particular in a differential pressure sensor, said diaphragm being of the corrugated type.

BACKGROUND OF THE INVENTION

The diaphragms for pressure sensors are generally in the form of a very thin metal disk, for example a disk which is about 1/10-th of a millimeter thick. The periphery of the disk is intended to be housed, for example, in the body of the sensor. Under the effect of a difference in the pressures applied either side of the diaphragm, the diaphragm deforms and the resulting displacement of the center of the diaphragm is measured. This displacement measurement serves to deduce the value of the pressure difference.

Diaphragms in the form of a disk which is plane when at rest, are very flexible. In addition, the rest position of the center of such a diaphragm (i.e. when the pressures on either side of the diaphragm are equal) is relatively insensitive to temperature variations, to variations in the static pressure (i.e. the same pressure applied to both faces of the diaphragm) and to the force clamping the periphery of the diaphragm in the body of the sensor. Unfortunately, the linear zone of the curve representing displacement of the center of the diaphragm as a function of the differential of pressure which is applied thereto only corresponds to a relatively small range of displacements.

To remedy this lack of diaphragm response, it is well known to use corrugated type diaphragms. Such a diaphragm is described, for example, in published French patent No. 2 016 115. The thin sheet from which the diaphragm is made is shaped, e.g. by stamping, so as to have concentric corrugations around the center of the diaphragm, thus forming an alternating sequence of "ridges" and "furrows" from the periphery to the center. The diaphragm has circular symmetry about an axis which is perpendicular to its average plane. Because of the corrugations, the diaphragm has a displacement to differential pressure response which is substatially linear over a much wider range of displacements.

However, known corrugated diaphragms of circular symmetry have the drawback of being highly sensitive to temperature variations, to variations in static pressure and to the clamping of the periphery of the diaphragm in the body of the sensor. The effect of these spurious influences is particularly felt around the zero point of the sensor (i.e. the position of the center of the diaphragm when the differential pressure applied thereto is zero) and also on the sensitivity of the sensor.

Thus, when the temperature varies, or with variations in the clamping of the membrane in its housing, or when there are variations due to static pressure deformations, the periphery of the diaphragm is subjected to variations in radius which are imposed by relative deformation of the body (for example differential thermal expansion between the body of the sensor and the membrane).

These radius variations give rise to a variation in the sensitivity of the diaphragm both in the case of a diaphragm having circular corrugations about the axis of the diaphragm and in the case of a plane diaphragm. These variations in radius also cause a change in the position of the center of the diaphragm except when the diaphragm is plane by virtue of its perfect symmetry on either side of the plane in which the diaphragm is housed.

If the diaphragm is plane, the center does not move under the effect in variations of radius since the radial stresses which result therefrom are in the plane of symmetry of the diaphragm. In contrast, in circularly symmetrical corrugated diaphragms the housing plane is not a plane of symmetry and the center moves under the effect of the radial stresses. The resulting variations in the sensor zero point can be most disadvantageous in some applications.

To remedy this drawback of conventional corrugated diaphragms, the main object of the present invention is to provide a corrugated diaphragm which retains the advantages of conventional corrugated diaphragms, i.e. linear response over a wide range of displacements, but which has a zero point that is not sensitive to variations in temperature, static pressure or peripheral clamping force.

SUMMARY OF THE INVENTION

This object is achieved by means of a diaphragm which, according to the invention, is made from a thin metal sheet comprising a plane peripheral zone disposed in a housing plane; a parallel plane central zone disposed in the said housing plane and having a center; and, between said peripheral zone and said central zone, a corrugated zone, wherein the said corrugated zone is constituted by 2n (where n is an integer) corrugated portions, each corrugated portion extending from the said central zone to the said peripheral zone, n of the corrugated portions being of a first type and the other n corrugated portions being of a second type, the corrugated portions of one type being a geometrical transformation of the adjacent corrugated portions of the other type, said geometrical transformation being chosen from the group consisting in a first geometrical transformation comprising a 180° rotation about a rectilinear segment disposed in the said housing plane and extending from the said center to the said peripheral zone; and a second geometrical transformation consisting in a rotation through an angle of $2\pi/2n$ about the axis of the said diaphragm perpendicular to the housing plane and passing through the said center, followed by a symmetry about the housing plane.

This thus provides a diaphragm having n corrugated portions of the first type and corrugated portions of the second type, given the geometrical relationship which exists between the corrugated portions of the two types, the housing plane of the diaphragm is functionally a plane of symmetry for the diaphragm relative to radial stresses induced by variations in radius caused by the spurious phenomena mentioned above.

According to a first implementation, two adjacent corrugated portions are separated by a connection zone disposed on either side of a portion of a curve disposed in the said housing plane and extending from the said central zone to the said peripheral zone, the said portion of a curve being the said segment when the said first transformation is used.

Preferably n is even. Thus, two diametrically opposite corrugated portions are of the same type, i.e. are identical. For reasons of symmetry the entire central zone remains perpendicular to the axis of symmetry of the membrane even when displaced.

Also preferably, the peaks of the corrugations project orthogonally from the housing plane around concentric circles, and the portions of a curve are straight line segments passing through the common center of the said circles.

According to a second implementation, a corrugated portion of one type is related to a corrugated portion of the other type by the said second geometrical transformation, and each corrugated portion consists in a single corrugation extending from the central zone to the peripheral zone, the peak of said corrugation projecting from the housing plane along a portion of a spiral curve which extends from the said central zone to the said peripheral zone.

BRIEF DESCRIPTION OF THE DRAWINGS

Embodiments of the invention are described by way of example with reference to the accompanying drawings, in which:

FIG. 1 is a plan view of a first embodiment of a diaphragm in accordance with the invention;

FIG. 2 is a vertical section on a folded line II—II' of FIG. 1, through the first embodiment of the diaphragm;

FIG. 3 is a vertical section on a line III—III' of FIG. 1 through the first embodiment of the diaphragm;

FIG. 6 is a plan view of a second variant of the first embodiment of a diaphragm in accordance with the invention;

FIG. 7 is a plan view of a third variant of the first embodiment of a diaphragm in accordance with the invention;

FIG. 8a is a plan view of a second embodiment of a diaphragm in accordance with the invention;

FIGS. 8b and 8c are sections on lines BB and CC of FIG. 8a;

FIG. 9a is a plan view of a third embodiment of a diaphragm in accordance with the invention;

FIGS. 9b and 9c are sections on lines DD and EE of FIG. 9a; and

MORE DETAILED DESCRIPTION

Figure 4:
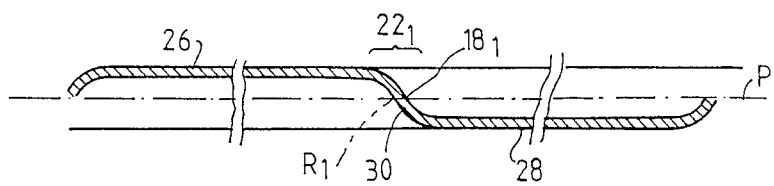
FIG. 4 is a developed vertical section on an arc of a circle IV—IV of FIG. 1.

A first embodiment of a diaphragm in accordance wtih the invention is described with reference to FIGS. 1 to 4.

FIG. 1 is a plan view of one face of the diaphragm. It is in the shape of a disk 10 having a center O. The disk is made from a thin sheet, e.g. of stainless steel, having a thickness of 1/10-th of a millimeter in the example described. The sheet is shaped, e.g. by stamping, to define a plane peripheral zone 12, a corrugated zone 14 inside the peripheral zone, and a circular central zone 16 which is plane and which has the point O as its center. The peripheral zone 12 is disposed in a plane P (FIG. 2) which is referred to as the housing plane. The central zone 16 is disposed in the same plane.

The corrugated zone 14 is constituted by 2n corrugated portions where n is an integer. Preferably, n is of the form $n = 2k$, where k is an integer.

In the FIG. 1 example, k is equal to one and the four corrugated portions are referenced $18_1$ to $18_4$. The corrugated portions $18_1$ to $18_4$ are separated from one another by four connection zones referenced $20_1$ to $20_4$. Each connection zone is disposed on either side of a portion of a curve which extends from the central zone 16 to the peripheral zone 12 and which is disposed in the housing plane P. More generally, there are 2 n connection zones. In the FIG. 1 example, the portions of a curve are segments $R_1$ to $R_4$ of straight lines passing through the center O of the disk 10. The connection zone $20_1$ is disposed about the segment $R_1$, the zone $20_2$ about the segment $R_2$, etc... Two consecutive segments are at an angle of 90°, or more generally at an angle of 360°/2n. A more accurate definition of the connection zones is given below with reference to FIGS. 4 to 7.

In each corrugated portion $18_1$ to $18_4$, there are corrugations which, looked at from one face of the diaphragm, are in the form of alternating ridges B (shown in a solid line in FIG. 1) and furrows C (shown in a dashed line in FIG. 1). Each corrugated portion comprises Q corrugations. In the example shown, Q is equal to seven. The peaks of the corrugations project orthogonally from the plane P over Q circles $D_1$ to $D_7$ centered on the point O. In FIGS. 2 and 3 the points at which these circles intersect the section planes are marked. Thus, the fourth set of corrugations in each of the four corrugated portions project from the same circle $D_4$.

In a first embodiment, the corrugation of two adjacent corrugated portions projecting from the same circle are respectively a ridge B and a furrow C. For example, the fourth corrugation in portion $18_1$ is a ridge B while the fourth corrugation in the portions $18_4$ is a furrow C. This can clearly be seen in FIG. 2. In contrast, FIG. 3 shows that the corrugations in the same positions in opposite portions $18_2$ and $18_4$ are both the same, with both either being a ridge B or a furrow C. Further, the corrugations projecting from the same circle all project from circular arcs of the same length. Thus, round any one circle the total length of the ridge corrugations is the same as the total length of the furrow corrugations.

In the example shown in FIGS. 1 to 4, the corrugations are all of the same peak-to-peak amplitude e, for example 0.8 mm. Naturally, as is well known, the corrugations closer to the center could be of lower amplitude than those closer to the periphery. However, in this case the corrugations (ridges or furrows) projecting from the same circle should be of the same amplitude.

More generally, in the first embodiment, the diaphragm comprises n corrugated portions of a first type which are all identical to one another, and n corrugated portions of a second type which are also all identical to one another. A corrugated portion of the first type is a geometrical transformation of a corrugated portion of the second type, and in particular the geometrical transformation consists in rotating a portion of one type by $2\pi/2n$ about the center O and then a symmetry about the housing plane P.

FIG. 4 shows a first method of making the connection zones. It shows, for example, the connection zone $20_1$. The connection zone constitutes a combination of seven transition zones such as $22_1$ in which a corrugation projecting from a given one of the circles $D_1$ to $D_7$ changes between being a ridge B and a furrow C. In the cylindrical section of FIG. 4, the peak 26 of a ridge B changes to a peak 28 of a furrow C and the section of the connection surface 30 between the ridge and the furrow is a slope. This case shows a direct connection between a ridge and a furrow.

Tests have been performed on a diaphragm as described above, in which the outside diameter was 50 mm, the circle $D_7$ was 40 mm in diameter and the circle $D_1$ was 12 mm in diameter. The variation of the zero point was much less than 0.5% for a temperature variation of 100° C., and was less than 0.1% for a static pressure variation of 100 bar. In contrast, a diaphragm having exactly the same characteristics but comprising conventional corrugations, i.e. corrugations having circular symmetry, the above figures are respectively multiplied by 10 and by 5.

Figure 5:
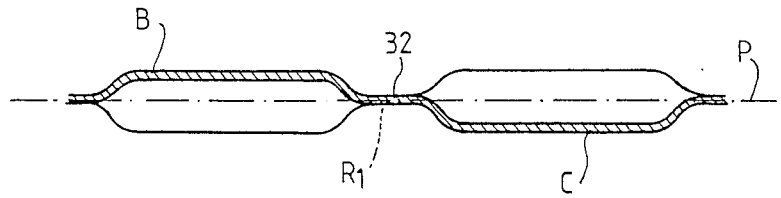
FIG. 5 is a similar view to FIG. 4, but showing a first variant of the first embodiment of the diaphragm.

FIG. 5 shows a variant in which the connection between the peak 26 of a ridge B and the peak 28 of a furrow C takes place via an intermediate plane portion referenced 32. The said plane portions are disposed in the average plane P of the diaphragm. The set of plane portions 32 constitutes the connection zones $20_1$ which lies along the segment $R_1$.

FIG. 6 shows another variant embodiment for the connection zones $20_1$ to $20_4$ which continue to be disposed along the straight line segments $R_1$ to $R_4$. In this embodiment, the two ridge portions projecting from the largest diameter circle $D_7$ are connected to the two ridge portions projecting from the next largest diameter circle $D_6$. In FIG. 6, the two outermost ridge portions 50 and 52 belong to the corrugated portions $18_1$ and $18_3$ and they are connected to two ridge portions 54 and 56 belonging to the corrugated portions $18_2$ and $18_4$. They are connected by short ridge portions referenced 58, 60, 62 and 64 which intersect the straight line segments $R_1$ to $R_4$ obliquely. The ridge-interconnection pattern is continued for the other circles, except that the innermost ridges 66 and 68 of the corrugated portions $18_1$ and $18_3$ projecting from the circle $D_1$ are not connected to other ridges. The same pattern is followed for interconnecting the furrows.

In certain applications of such diaphragms, it may be feared that the connection zones disposed along "radiuses" of the diaphragm-constituting disk 10 may give rise to reduced performance of the diaphragm. In a variant shown in FIG. 7, the connection zones referenced $70_1$ to $70_4$ are disposed along portions of spirals $S_1$ to $S_4$ which are offset relative to one another by 90°. The circles $D_1$ to $D_4$ intersect all of the spirals $S_1$ and $S_4$ at the same angle.

As in the above-described variants, the corrugations on any one of the circles $D_1$ to $D_7$ change between being a ridge and a furrow on either size of each connection zone. This can be seen in FIG. 7 which uses the same conventions as FIG. 1 for showing ridges and furrows.

If the sheet from which the diaphragm is made is itself made by rolling, it is preerable for two aligned connection zones to be disposed along the rolling direction. In FIG. 1, an arrow F symbolizes the rolling direction. The connection zones $20_2$ and $20_4$ are thus disposed along the rolling direction defined by the arrow F.

In the first embodiment described with reference to FIGS. 1 to 7, the peaks of the corrugations, i.e. the ridges and furrows, project orthogonally onto the housing plane P along concentric circles having the center of the diaphragmn as their common center.

Figure 8B:
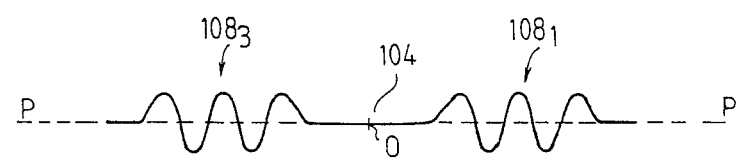
Figure 8C:
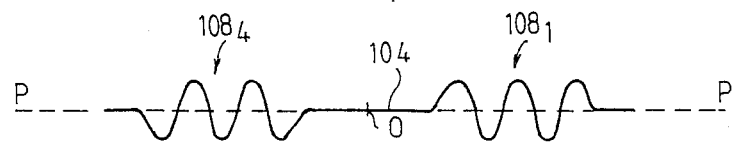

FIGS. 8a to 8c show a second embodiment of the diaphragm in which the corrugations have a different shape.

FIG. 8a shows a diaphragm 100 which is non-circular in shape. The diaphragm comprises a peripheral plane zone 102, a central plane zone 104 containing the center O of the diaphragm and a corrugated zone 106 disposed between the plane zones 102 and 104. The plane zones 102 and 104 are situated in the housing plane P.

The corrugated zone 106 is constituted by four corrugated portions $108_1$ to $108_4$ separated by four connection zones $110_1$ to $110_4$. Each connection zone $110_1$ to $110_4$ is disposed on either side of one of four segments $R'_1$ to $R'_4$ of straight lines passing through the center O of the diaphragm. The segments $R'_1$ to $R'_4$ are situated in the housing plane P. Each consecutive pair of segments are at 90° to one another. Each corrugated portion $108_1$ to $108_4$ is constituted by an alternation of ridges B and furrows C. As can be seen in FIG. 8a the corrugated portions $108_1$ and $108_3$ are identical and of a first type while the corrugated portions $108_2$ and $108_4$ are identical and of a second type. In this second embodiment, the shape and the disposition of the corrugations are such that a corrugated portion of one type, e.g. the portion $108_1$ of the first type, is a geometrical transformation of an adjacent corrugated portion of the other type, e.g. the corrugated portion $108_2$ which is of the second type, where the geometrical transformation comprises a rotation of 180° about the segment $R_1$ which defines the connection zone $110_1$ between the corrugated portions $108_1$ and $108_2$ in question. Likewise, the corrugated portion $108_2$ is derived from the corrugated sheet portion $108_3$ by a rotation through 180° about the straight line defined by the segment $R_2$, etc.

More generally, the diaphragm may comprise 2n corrugated portions and 2n connection zones. There are n corrugated portions of the first type and n portions of the second type. The geometrical relationship between the different corrugated portions requires all of the corrugated portions to have the same number of corrugations.

Figure 9B:
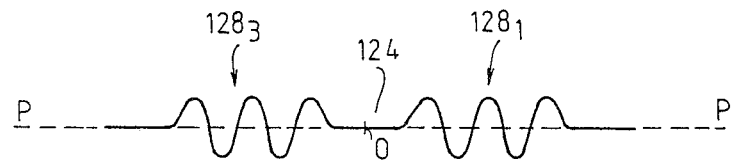
Figure 9C:
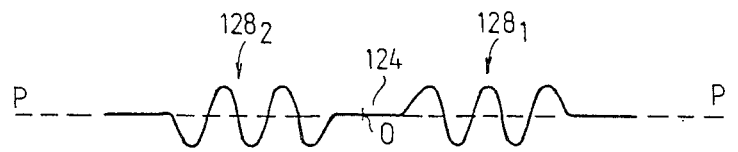

FIGS. 9a to 9c show a third embodiment of the diaphragm. The diaphragm 120a has the general form of a disk about a center O. It comprises a peripheral plane zone 122, a central plane zone 124, and a corrugated zone 126 disposed between the central zone and the peripheral zone. The plane zones 122 and 124 are disposed in the housing plane P.

The corrugated zone 126 comprises four corrugated portions $128_1$ to $128_4$ which are separated by four connection zones $130_1$ to $130_4$. In the specific example shown of the third embodiment, each connection zone is disposed about a corresponding portion of a spiral $S'_1$ to $S'_4$ situated in the housing plane P. Two consecutive spiral portions are at an angle of 90° from each other. However, the connection zones $130_1$ to $130_4$ could be disposed on straight line segments as shown in the FIG. 8a embodiment. The corrugated portions $128_1$ and $128_3$ are identical and of a first type while the corrugated portions $128_2$ to $128_4$ are likewise identical and of a second type. Each corrugated portion $128_1$ to $128_4$ is constituted by a succession of corrugations alternately comprising ridges B and furrows C.

In this third embodiment of a diaphragm, a corrugated portion of the first type (e.g. the portion $128_1$) may be transformed into an adjacent corrugated portion of the second type (e.g. the portion $128_2$) by a rotation through 90° about an axis ZZ passing through the center O perpendicular to the housing plane P, and then reflecting in the housing plane P.

More generally, the diaphragm in accordance with the third embodiment of the invention comprises 2n corrugated portions and 2n connection zones. Each corrugated portion corresponds to an angle at the center equal to $2\pi/2n$ less the angle at the center corresponding to a connection zone. There are thus n corrugated portions of the first type and n corrugated portions of the second type. A corrugated portion of the first type is transformed into an adjacent corrugated portion of the second type of rotation through $2\pi/2n$ about the axis ZZ' and by a symmetry about the housing plane P. Further, it must be understood that when it is indicated that each connection zone is disposed on either side of a portion of a curve, this is true both for its projection in the connection plane and for a surface containing the portion of the curve and orthogonal to the housing plane.

According to this third type of embodiment of a diaphragm, all the corrugated portions $128_1$ to $128_4$ comprise the same number of corrugations.

It will be understood that the first embodiment in which the corrugations project onto the housing plane in concentric circles constitutes a limiting case between the second variant shown in FIG. 8a and the third variant in FIG. 9a. In particular, with reference to FIG. 1 it can be seen that a corrugated portion of the first type (for example the portion $18_1$) may be transformed into a corrugated portion of the other type (for example the portion $18_2$) either by a rotation through 180° about the straight line segment $R_1$, or else by a rotation through 90° about the center O followed by a symmetry about the housing plane P.

In the embodiments described so far, each corrugated portion is constituted by a plurality of corrugations forming alternate ridges and furrows. When passing between a ridge and a furrow, the sheet of the diaphragm passes through the housing plane along a portion of a curve.

In addition, passing from one corrugated portion to the next corrugated portion takes place through a connection zone disposed about a portion of a curve situated in the housing plane. These second curve portions are either straight line segments or else they are curves which are not very far removed from straight line segments and which in any case make a non-negligible angle with the portions of curves where the corrugated sheet material passes through the housing plane. In some conditions this disposition can lead to linearity defects in the displacement/differential pressure response of the diaphragm, which defects exceed admissible tolerances.

In such cases it is possible to use a diaphragm in accordance with another embodiment of the invention which is described below with reference to FIGS. 10, 10a and 10b.

Figure 10:
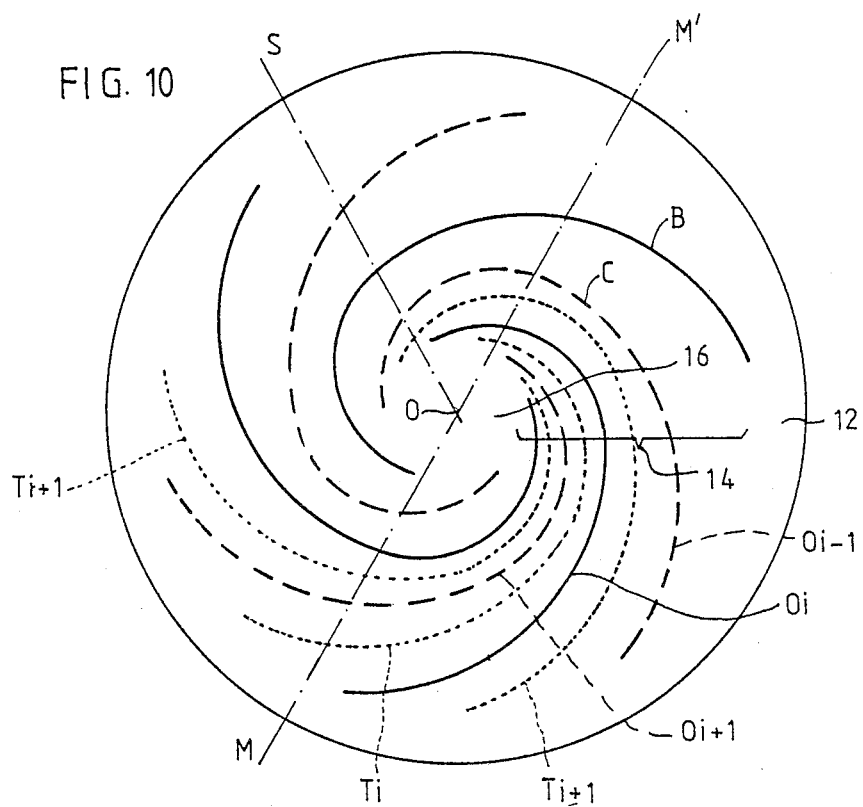
FIGS. 10, 10a and 10b illustrate a fourth embodiment of a diaphragm in accordance with the invention, and comprise a plan view and two sections on lines MM and MS respectively.
Figure 10A:
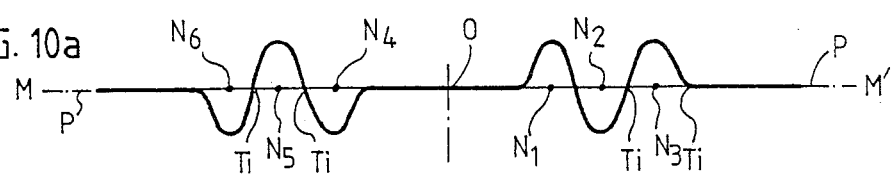
Figure 10B:
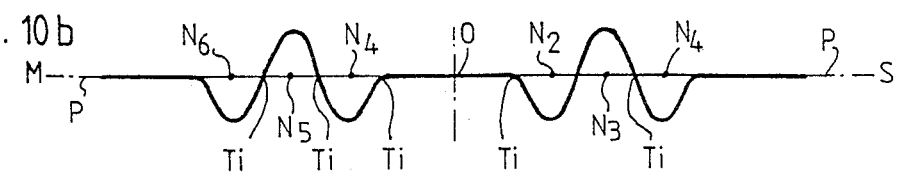

As can be seen in FIG. 10, the diaphragm comprises a plane peripheral zone 12 defining the housing plane P of the diaphragm, a plane central zone 16 disposed in the housing plane P and having a center O, and a corrugated zone 14 extending from the central zone 16 to the peripheral zone 12.

The corrugated zone 14 is constituted by 2n corrugations. More precisely, looking at the face of the diaphragm which is visible in FIG. 10, the zone 14 comprises n ridges symbolized by continuous lines and marked B, and n furrows symbolized by dashed lines and marked C. In FIG. 10, the number n is equal to 3. In this embodiment the peaks of the ridges B and of the furrows C project orthogonally in the housing plane P along portions of curves $N_1$ to $N_{2n}$ ($N_1$ to $N_6$ in the case of FIG. 10) having the general form of spirals. Further, one of these curves $N_i$ may be derived from the adjacent curve $N_{i-1}$ or $N_{i+1}$ by a rotation through $+2\pi/2n$ or $-2\pi/2n$ about the axis of the diaphragm passing through the center O and perpendicular to the housing plane P. Further, if the corrugation associated with the curve $N_i$ is a furrow, then the corrugation $O_{i-1}$ and $O_{i+1}$ associated with the curves $N_{i-1}$ or $N_{i+1}$ are ridges. In other words, a corrugation is derived from either of the adjacent corrugations by a rotation of $\pm 2\pi/2n$ followed by reflection in the housing plane P.

If this embodiment is compared with the embodiments of the previous figures, it can be seen that the corrugated zone 14 is still constituted by 2n corrugated portions, but that each corrugated portion comprises a single corrugation $O_i$ which is projected orthogonally in the housing plane P along a curve which is spiral-shaped. Thus, a corrugated portion is still derived from the adjacent portions by a rotation of $2\pi/2n$ about the axis of the diaphragm followed by a symmetry about the housing plane.

Further, the connection zones shown in the embodiments of FIGS. 1 to 9 are reduced, in the FIG. 10 embodiment to a portion of a curve defined by the intersection of the diaphragm-constituting sheet with the housing plane P where it passes between an adjacent ridge and furrow. The curves marked $T_i$ in FIGS. 10, 10a and 10b are thus likewise spiral-shaped.

It must be understood, that the term "spiral-shaped" curve applies to any curve whose concave side is always turned towards the center O of the diaphragm, and that the current point of the curve moves continuously further away from the center point O as the current point moves along the curve from the central zone to the peripheral zone. Thus a "spiral-shaped" curve could be built up from a plurality of circular arcs having different radiuses and tangentially interconnected.

Preferably, the FIG. 10 embodiment has an odd number n. For example, it may be equal to 3 or 5. With odd n, the number of corrugations (2n) is unaffected by problems due to the rolling direction of the sheet material from which the diaphragm is made.

I claim:

1. A diaphragm for a pressure sensor made from a thin metal sheet comprising a plane peripheral zone disposed in a housing plane; a parallel plane central zone disposed in said housing plane and having a center; and, between said peripheral zone and said central zone, a corrugated zone, wherein said corrugated zone is constituted by 2n (where n is an integer) corrugated portions, each corrugated portion extending from said central zone to said peripheral zone, n of the corrugated portions being of a first type and the other n corrugated portions being of a second type, the corrugated portions of one type being a geometrical transformation of the adjacent corrugated portions of the other type, said geometrical transformation being chosen from the group consisting of a first geometrical transformation comprising a 180° rotation about a rectilinear segment disposed in said housing plane and extending from said center to said peripheral zone and a second geometrical transformation consisting of a rotation through an angle of $2\pi/2n$ about the axis of said diaphragm perpendicular to the housing plane and passing through said center, followed by a symmetry about the housing plane, wherein a peak of at least one of the corrugated portions is both continuous and of substantially constant amplitude over a curvilinear segment disposed in said housing plane.

2. A diaphragm according to claim 1, wherein two adjacent corrugated portions are separated by a connection zone disposed on either side of a portion of a curve disposed in said housing plane and extending from said central zone to said peripheral zone, said portion of a curve being said segment when said first transformation is used.

3. A diaphragm according to claim 2, wherein the number n is even.

4. A diaphragm according to claim 2, wherein a corrugated portion of one type is related to a corrugated portion of the other type by said second geometrical transformation, and wherein each corrugated portion consists of a single corrugation extending from the central zone to the peripheral zone, the peak of said corrugation projecting in the housing plane along a portion of a spiral curve which extends from said central zone to said peripheral zone, and each of said portions of a curve is a portion of a spiral curve which extends from said central zone to said peripheral zone.

5. A diaphragm according to claim 4, wherein the number n is odd.

6. A diaphragm for a pressure sensor made from a thin metal sheet comprising a plane peripheral zone disposed in a housing plane; a parallel plane central zone disposed in the said housing plane and having a center; and, between said peripheral zone and said central zone, a corrugated zone, wherein said corrugated zone is constituted by 2n (where n is an integer) corrugated portions, each corrugated portion extending from said central zone to said peripheral zone, n of the corrugated portions being of a first type and the other n corrugated portions being of a second type, each corrugated portion comprising Q corrugations (where Q is an integer) and wherein the peaks of the Q corrugations project orthogonally in said housing plane onto Q concentric circles, and wherein two adjacent corrugated portions are separated by a connection zone and disposed on either side of a portion of a curve disposed in said housing plane and extending from said central zone to said peripheral zone, the corrugated portions of one type being a geometrical transformation of the adjacent corrugated portions of the other type, said geometrical transformation being chosen from the group consisting of a first geometrical transformation comprising a 180° rotation about a rectilinear segment disposed in said housing plane and extending from said center to said peripheral zone and a second geometrical transformation consisting of a rotation through an angle of $2\pi/2n$ about the axis of said diaphragm perpendicular to the housing plane and passing through said center, followed by a symmetry about the housing plane, said portion of a curve being said segment when said first transformation is used.

7. A diaphragm for a pressure sensor made from a thin metal sheet comprising a plane peripheral zone disposed in a housing plane; a parallel plane central zone disposed in said housing plane and having a center; and, between said peripheral zone and said central zone, a corrugated zone, wherein said corrugated zone is constituted by 2n (wherein n is an integer) corrugated portions, each corrugated portion extending from said central zone to said peripheral zone, n of the corrugated portions being of a first type and the other n corrugated portions being of a second type, the corrugated portions of one type being a geometrical transformation of the adjacent corrugated portions of the other type, said geometrical transformation being chosen from the group consisting of a first geometrical transformation comprising a 180° rotation about a rectilinear segment disposed in said housing plane and extending from said center to said peripheral zone and a second geometrical transformation consisting of a rotation through an angle of $2\pi/2n$ about the axis of said diaphragm perpendicular to the housing plane and passing through said center, followed by a symmetry about the housing plane, and wherein a corrugated portion of one type is related to a corrugated portion of the other type of said second geometrical transformation, and each corrugated portion consists of a single corrugation extending from the central zone to the peripheral zone, the peak of said corrugation projecting in the housing plane along a portion of a spiral shaped continuous curve which extends from said central zone to said peripheral zone the concave side of said continuous curve being always turned toward the center of the diaphragm and the peak-to-peak amplitude of said corrugations being substantially constant, the disposition of said first and second type of corrugations being such that the central zone is free to move in response to applications of pressure to said diaphragm.

8. A diaphragm according to claim 7, wherein the number n is odd.

* * * * *